Patented Oct. 23, 1928.

1,688,457

UNITED STATES PATENT OFFICE.

ARTHUR EICHENGRÜN, OF CHARLOTTENBURG, GERMANY, ASSIGNOR TO CELANESE CORPORATION OF AMERICA, A CORPORATION OF DELAWARE.

PROCESS FOR THE PRODUCTION OF THIN FILMS OF CELLULOSE DERIVATIVE.

No Drawing. Application filed August 3, 1923, Serial No. 655,525, and in Germany August 10, 1922.

The present invention relates to a process for the production of thin films of cellulose derivatives.

It is known that relatively thin films especially for the production of film bases, may be produced from cellulose derivatives such as nitro-cellulose, nitro-acetyl-cellulose and cellulose acetate, by pouring solutions thereof upon metal bases, and removing the films therefrom after drying. More particularly film bases are produced in long lengths by causing the solutions to flow from a stationary receptacle onto a travelling metal band, from which the film band is rolled off at the same speed as that at which the metal band moves, so that it is possible to produce an endless film band in a continuous manner.

It has however never been possible to produce in this manner very thin films from cellulose derivatives, because such thin films adhere very firmly to the metal and on removal therefrom, especially on being rolled up in the above-described manner are very easily rent, or torn completely. When loosening the end of the film from the metal band, it is hardly possible to avoid the band being scratched in consequence of the thinness of the film. Although such very thin layers of cellulose esters, owing to their resistance to water, may serve as a substitute for very thin gelatine films and especially for thin viscose films (known under the name of "Cellophane", "Gaudafil" and the like), and although owing to the sensitiveness towards water of the aforesaid products, a demand for such thin, non-hygroscopic films undoubtedly exists, it has up to the present not been possible to produce them on a manufacturing scale, that is, in endless bands or long lengths.

I have now succeeded in devising a process according to which such thin layers can be removed with ease from their base, so that they can be produced and rolled up in a continuous manner.

According to this process the base upon which the dissolved cellulose masses are spread, poured or sprayed, consists of or is coated with a material which does not in any way combine with the cellulose layers, but which on the contrary has preferably a repellent action thereon. In those cases where the base material does not per se possess a repellent action, it is preferable to produce such an action by suitable additions, which either are admixed with the base material or with the cellulose layer itself. For this purpose, for example oils, mineral oils, fats, glycerine, salts especially alcohol-soluble metal salts and other suitable organic or inorganic substances are used.

As base material with which the carriers, (which may consist of stone, clay, glass, porcelain or metal, used in most cases in the shape of rollers or cylinders or in long or endless, i. e., closed bands of sheet-metal, cardboard, paper, fabrics or the like) are coated, such cellulose derivatives as possess different solubility to those cellulose derivatives from which the films are to be produced come principally into question.

As is well known, various cellulose compounds such as nitro-celluloses, cellulose acetates, alkyl celluloses, aryl celluloses, are uniformly soluble in many solvents, such as for instance acetone or glacial acetic acid, whereas other solvents are solvents for the one derivative and precipitants for the other.

Even the various acidulation and alkylation stages are often entirely different in their solubilities; for example ethyl celluloses exist which are soluble in water, whereas other ethyl celluloses are insoluble in water. Thus, for the production of thin films from a cellulose derivative, for example alcohol-soluble ethyl cellulose, such a cellulose derivative is chosen as base which is not attacked by alcohol, such as for example cellulose acetate, to which glycerine or a glycerine derivative or high boiling mineral oil such as paraffin, is preferably added for the purpose of easing the removal of the ethyl cellulose film. Of course, it is also possible to employ such solvents which attack or dissolve the base, because surprisingly enough, it has been found that after drying, the layers may nevertheless be easily separated. Consequently it is even possible to pour several layers of different cellulose derivatives one upon the other, and after drying to separate them from each other in the form of long bands. Thus for example it is possible to produce above a layer of cellulose acetate, a second layer of ethyl cellulose and upon this a third layer of nitrocellulose, and upon this a fourth layer of benzyl cellulose.

The layers may be produced according to the method usual in the production of films, by applying liquid solutions by means of a pouring machine or also by spreading highly concentrated paste-like masses upon the base in a thin layer and distributing the latter by means of a roller, a palette-knife or any other suitable device.

Such viscous or even pasty solutions dry much more quickly, consequently adhere less strongly to the base, and can be more easily removed than films produced by the slow drying of the solutions used in the manufacture of films. When using such pasty solutions containing little solvent, it is consequently also possible to use such layers as carriers which consist only of the cellulosic material serving as a base, for example endless film bands of celluloid, ethyl cellulose or cellulose acetate.

Inasmuch as the thin films, especially those of cellulose esters and ethers, form relatively hard and easily tearable layers which is especially disadvantageous in case of films of great thinness, such as 0.01 to 0.02 mm. are produced, it is preferable to add softening agents to the solutions and such softening agents must preferably be used which have no solvent action upon those cellulose derivatives forming the base. Thus, for example to an ethyl cellulose solution, preferably linseed oil is added, which does not attack the base of benzyl-cellulose.

Filling materials of any kind such as mineral powders, bronze powders, soluble and insoluble colouring matter as well as plastifying agents may be added to the base as well as to the solutions used for forming the films.

When carrying out the process it has been found that the removal of the thin films may be facilitated and tearing may be prevented if these are pulled from the base before completely dry, that is, as soon as possible after solidification, because a certain content in solvents decreases the adhesive power of the films and increases their resistance and stability, thereby facilitating the continuous removal and winding up of the films.

I claim:—

1. The process for the production of thin films of cellulose derivatives, especially of cellulose ethers and cellulose esters, which consists in spreading a solution of said cellulose derivative in a very thin layer upon a base comprising a cellulose derivative other than that used for the production of the film, to which has been added matter diminishing the adhesiveness of the dried film produced on evaporation of the solvent even if said film be of extreme thinness, said solution containing matter having no solvent action upon said base, removing said film when formed from said base, and rolling it into an endless band.

2. The process for the production of thin films of cellulose derivatives, especially of cellulose ethers and cellulose esters, which consists in spreading in a very thin layer upon a base, a solution of said cellulose derivative in a solvent having practically no solvent power for said base, said base comprising a cellulose derivative other than that used for the production of the film to which has been added matter diminishing the adhesiveness of the dried film produced on evaporation of the solvent, even if said film be of extreme thinness, removing said film when formed from said base, and rolling it into an endless band.

3. The process for the production of thin films of cellulose derivatives, especially of cellulose ethers and cellulose esters, containing added substances such as plastifying agents, dyes, mineral powders, bronze powders and the like, which consists in spreading a solution of said cellulose derivative in a very thin layer upon a base comprising a cellulose derivative other than that used for the production of the film, to which has been added matter diminishing the adhesiveness of the dried film produced on evaporation of the solvent even if said film be of extreme thinness, removing said film when formed from said base, and rolling it into an endless band.

4. The process for the production of thin films of cellulose derivatives, especially of cellulose ethers and cellulose esters, which consists in spreading in a very thin layer upon a base a solution of said cellulose derivative containing matter having no solvent action upon said base, and containing added substances such as plastifying agents, dyes, mineral powders, bronze powders and the like, said base comprising a cellulose derivative other than that used for the production of the film, to which has been added matter diminishing the adhesiveness of the dried film produced on evaporation of the solvent even if said film be of extreme thinness, removing said film when formed from said base and rolling it into an endless band.

5. The process for the production of thin films of cellulose derivatives, especially of cellulose ethers and cellulose esters, which consists in spreading in a very thin layer upon a base a solution of said cellulose derivative in a solvent having practically no solvent powder for said base, and containing added substances such as plastifying agents, dyes, mineral powders, bronze powders and the like, said base comprising a cellulose derivative other than that used for the production of the film to which has been added matter diminishing the adhesiveness of the dried film produced on evaporation of the solvent, even if said film be of extreme thinness, removing said film when formed from said base and rolling it into an endless band.

6. The process for the production of thin films of cellulose derivatives, especially of cellulose ethers and cellulose esters, which consists in spreading a highly viscous or pasty solution of said cellulose derivative in a very thin layer upon a base comprising plastified cellulose derivative other than that used for the production of the film, removing said film as soon as possible after solidification from said base unsupported and rolling it into an endless band.

7. The process for the production of thin films of cellulose derivatives, especially of cellulose ethers and cellulose esters, which consists in spreading a highly viscous or pasty solution of said cellulose derivative in a very thin layer upon a base comprising a cellulose derivative other than that used for the production of the film, to which has been added matter diminishing the adhesiveness of the dried film produced on evaporation of the solvent even if said film be of extreme thinness, removing said film as soon as possible after solidification from said base and rolling it into an endless band.

8. The process for the production of thin films of cellulose derivatives, especially of cellulose ethers and cellulose esters, which consists in spreading a highly viscous or pasty solution of said cellulose derivative in a very thin layer upon a base comprising a cellulose derivative other than that used for the production of the film, to which has been added matter diminishing the adhesiveness of the dried film produced on evaporation of the solvent even if said film be of extreme thinness, said solution containing matter having no solvent action upon said base, removing said film as soon as possible after solidification from said base, and rolling it into an endless band.

9. The process for the production of thin films of cellulose derivatives, especially of cellulose ethers and cellulose esters, which consists in spreading in a very thin layer upon a base, a highly viscous or pasty solution of said cellulose derivative in a solvent having practically no solvent power for said base, said base comprising a cellulose derivative other than that used for the production of the film to which has been added matter diminishing the adhesiveness of the dried film produced on evaporation of the solvent, even if said film be of extreme thinness, removing said film as soon as possible after solidification from said base, and rolling it into an endless band.

10. The process for the production of thin films of cellulose derivatives, especially of cellulose ethers and cellulose esters, containing added substances such as plastifying agents, dyes, mineral powders, bronze powders and the like, which consists in spreading a highly viscous or pasty solution of said cellulose derivative in a very thin layer upon a base comprising a cellulose derivative other than that used for the production of the film, to which has been added matter diminishing the adhesiveness of the dried film produced on evaporation of the solvent even if said film be of extreme thinness, removing said film as soon as possible after solidification from said base, and rolling it into an endless band.

11. The process for the production of thin films of cellulose derivatives, especially of cellulose ethers and cellulose esters, which consists in spreading in a very thin layer upon a base, a highly viscous or pasty solution of said cellulose derivative containing matter having no solvent action upon said base, and containing added substances such as plastifying agents, dyes, mineral powders, bronze powders and the like, said base comprising a cellulose derivative other than that used for the production of the film, to which has been added matter diminishing the adhesiveness of the dried film produced on evaporation of the solvent even if said film be of extreme thinness, removing said film as soon as possible after solidification from said base and rolling it into an endless band.

12. The process for the production of thin films of cellulose derivatives, especially of cellulose ethers and cellulose esters, which consists in spreading in a very thin layer upon a base a highly viscous or pasty solution of said cellulose derivative in a solvent having practically no solvent power for said base, and containing added substances such as plastifying agents, dyes, mineral powders, bronze powders and the like, said base comprising a cellulose derivative other than that used for the production of the film to which has been added matter diminishing the adhesiveness of the dried film produced on evaporation of the solvent, even if said film be of extreme thinness, removing said film as soon as possible after solidification from said base and rolling it into an endless band.

13. The process for the production of thin films of cellulose derivatives, especially of cellulose ethers and cellulose esters, which consists in spreading a solution of one cellulose derivative in a very thin layer upon a base comprising a material to which the dried film produced on evaporation of the solvent does not adhere even if said film be of extreme thinness, spreading a second solution of a second cellulose derivative different to the first one upon said first layer, spreading a third solution of a third cellulose derivative different to the preceding derivatives upon said second layer and repeating this operation with other cellulose derivatives different to the preceding derivatives, thus producing any desired number of films of different cellulose derivatives upon each other on the same base, separating the film of each cellulose derivative formed and rolling them into endless bands.

14. The process for the production of thin films of cellulose derivatives, especially of cellulose ethers and cellulose esters, which consists in spreading a highly viscous or pasty solution of one cellulose derivative in a very thin layer upon a base comprising a material to which the dried film produced on evaporation of the solvent does not adhere even if said film be of extreme thinness, spreading a second highly viscous or pasty solution of a second cellulose derivative different to the first one upon said first layer, spreading a third highly viscous or pasty solution of a third cellulose derivative different to the preceding derivatives upon said second layer and repeating this operation with highly viscous or pasty solutions of other cellulose derivatives different to the preceding derivatives, thus producing any desired number of films of different cellulose derivatives upon each other on the same base, separating each film of each cellulose derivative as soon as possible after solidification and rolling them into endless bands.

In testimony whereof, I affix my signature.

ARTHUR EICHENGRÜN.